(12) United States Patent
Frankeberger et al.

(10) Patent No.: US 6,942,133 B2
(45) Date of Patent: Sep. 13, 2005

(54) VENTURI SYSTEM USING CLOSED LOOP AIR RETURN FOR CONVEYING FLEXIBLE FABRICS

(75) Inventors: Michael S. Frankeberger, Blue Springs, MO (US); Steven D. Twombly, Blue Springs, MO (US)

(73) Assignee: Automation Dynamics LLC, Independence, MO (US)

( * ) Notice: Subject to any disclaimer, the term of this patent is extended or adjusted under 35 U.S.C. 154(b) by 0 days.

(21) Appl. No.: 10/912,712

(22) Filed: Aug. 5, 2004

(65) Prior Publication Data

US 2005/0006424 A1 Jan. 13, 2005

Related U.S. Application Data

(60) Division of application No. 10/662,147, filed on Sep. 12, 2003, now Pat. No. 6,789,715, which is a continuation-in-part of application No. 09/892,929, filed on Jun. 27, 2001, now Pat. No. 6,619,525.

(51) Int. Cl.$^7$ .............................................. B65H 20/00
(52) U.S. Cl. .......................... 226/97.4; 226/7; 406/106
(58) Field of Search ......................... 226/7, 97.1, 97.4; 406/106, 197

(56) References Cited

U.S. PATENT DOCUMENTS

| | | |
|---|---|---|
| 3,951,461 A | 4/1976 | De Feudis |
| 3,980,166 A | 9/1976 | De Feudis |
| 4,056,959 A | 11/1977 | Ward |
| 4,076,321 A | 2/1978 | Haight et al. |
| 4,136,778 A | 1/1979 | Wortman et al. |
| 4,194,859 A | 3/1980 | Boon et al. |
| 4,195,498 A | 4/1980 | Pellerin |
| 4,422,565 A | 12/1983 | Reba |
| 4,849,999 A | 7/1989 | Humphreys et al. |
| 4,858,809 A | 8/1989 | Paulini et al. |
| 5,060,351 A | 10/1991 | Street |
| 5,065,928 A | 11/1991 | Davey et al. |
| 5,083,704 A | 1/1992 | Rounthwaite |
| 5,212,969 A | 5/1993 | Tsubaki et al. |
| 5,429,575 A | 7/1995 | Armour et al. |
| 5,727,909 A | 3/1998 | Laird |

*Primary Examiner*—Joe Dillon, Jr.
(74) *Attorney, Agent, or Firm*—Shook, Hardy & Bacon L.L.P.

(57) ABSTRACT

A venturi incorporated in a pneumatic tube conveying system for flexible textile fabrics such as uniforms and table linens handled in commercial laundries. The venturi includes an angled pipe which joins the main piping system at an acute angle and which receives air from a blower. An inside pipe is installed within the main piping to create a restriction at the connection of the venturi with the main piping. The restriction and angled connection of the venturi pipe creates a low pressure area which draws fabric articles through the piping and discharges them directly into receptacles such as sling carts. A screened vent in the piping downstream from the venturi allows the escape of air to enhance the reliability and efficiency of the pneumatic conveying system. The exposure of the vent can be adjusted by a sleeve that slides back and forth on the conveyor tube at the location of the vent. A closed-loop return air system extends from the vent to the suction side of the blower to reduce the noise level and provide more advantageous pressure conditions in the conveying system.

13 Claims, 2 Drawing Sheets

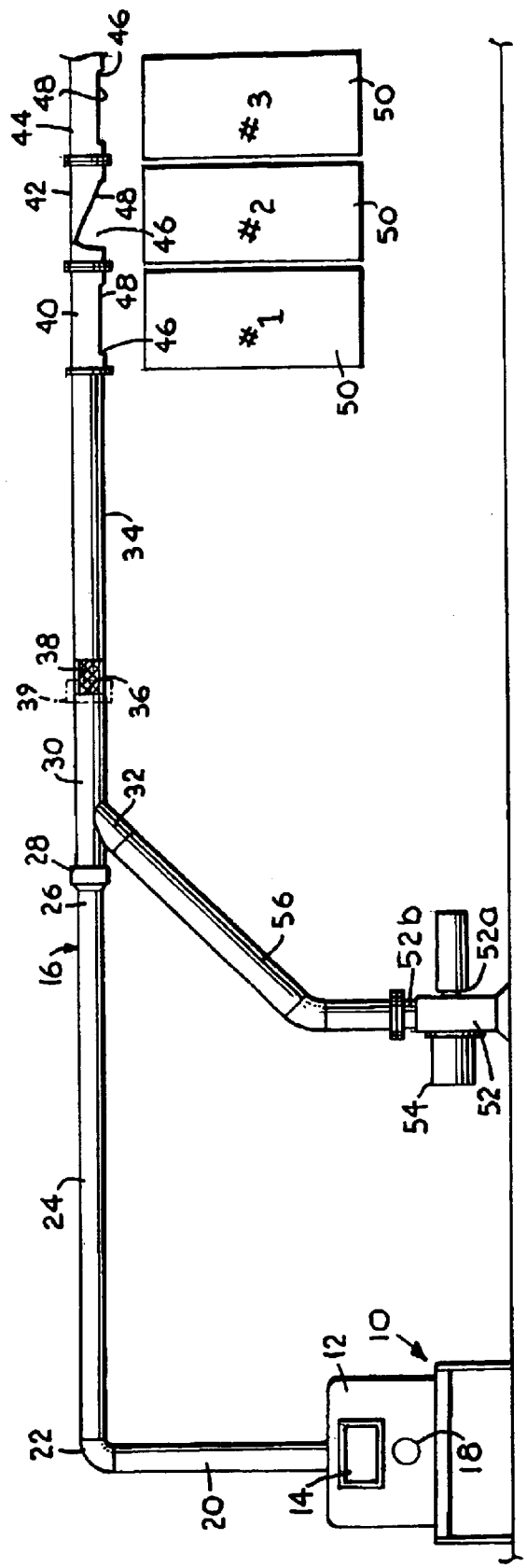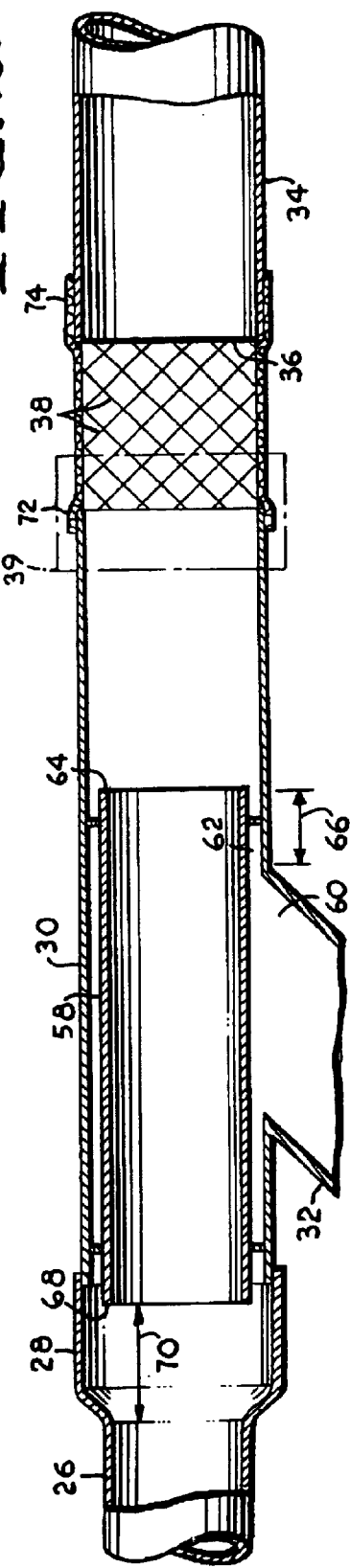

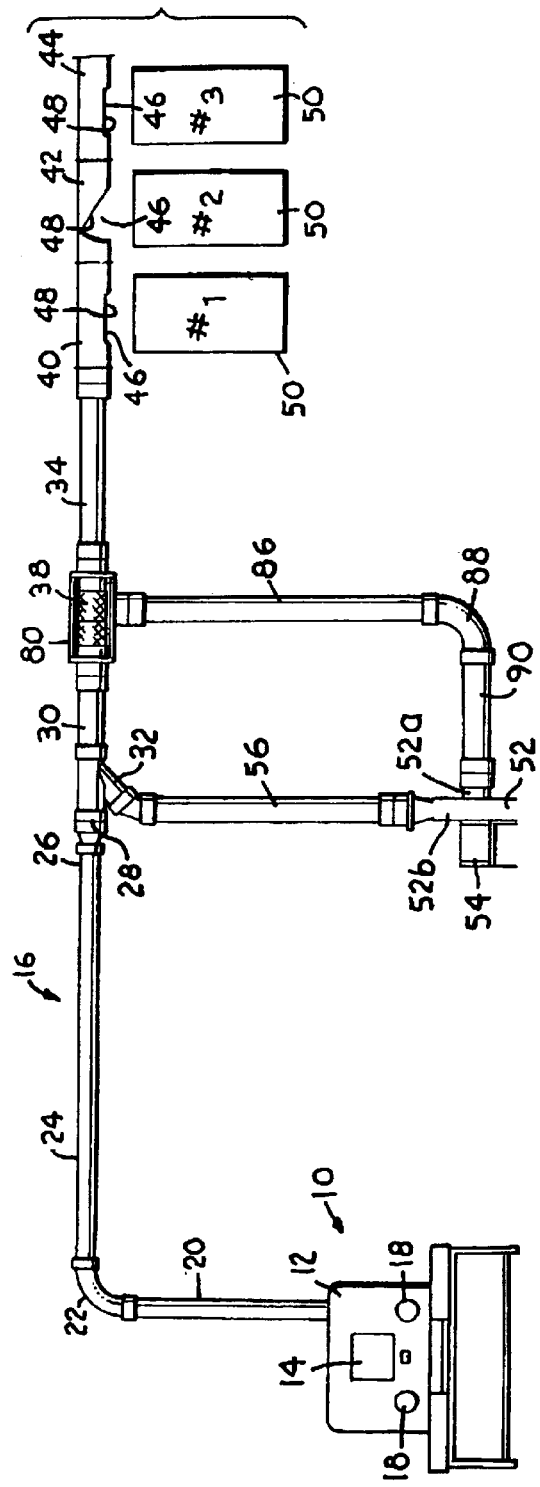
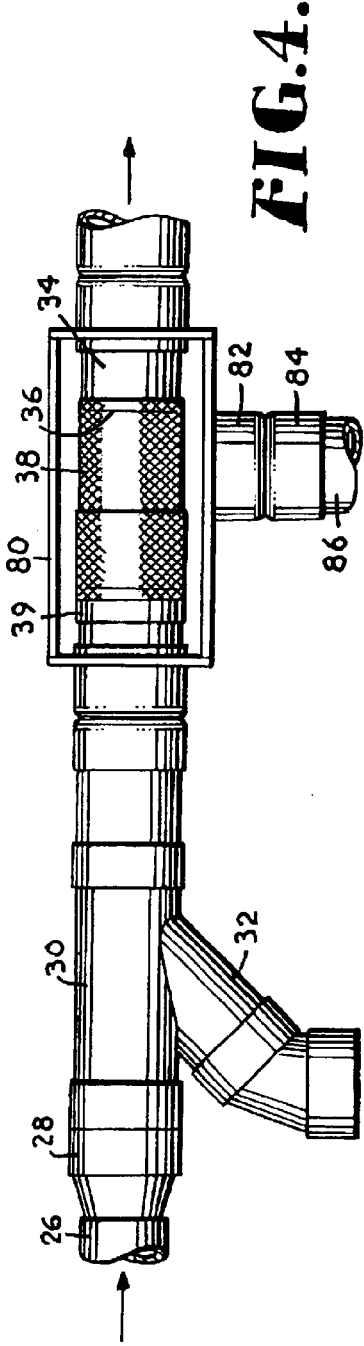

VENTURI SYSTEM USING CLOSED LOOP AIR RETURN FOR CONVEYING FLEXIBLE FABRICS

CROSS-REFERENCE TO RELATED APPLICATIONS

This application is a divisional of application Ser. No. 10/662,147, filed on Sep. 12, 2003 now U.S. Pat. No. 6,789,715, which is a continuation-in-part of application Ser. No. 09/892,929, filed on Jun. 27, 2001, now U.S. Pat. No. 6,619,525, issued Sep. 16, 2003, in the names of Michael S. Frankeberger and Steven D. Twombly.

STATEMENT REGARDING FEDERALLY SPONSORED RESEARCH OR DEVELOPMENT

Not applicable

TECHNICAL FIELD

This invention relates generally to the pneumatic conveying of flexible fabrics such as uniforms, table linens and other articles handled by commercial laundries and industrial uniform processing plants, as well as other fabric items that are conveyed between different locations in other types of applications. More particularly, the invention is directed to a method and apparatus that makes use of a venturi to provide a suction force for pulling fabrics through conveyor tubes and a closed loop return conduit providing an air return path from a vent to the suction side of a blower that feeds air to the venturi.

BACKGROUND OF THE INVENTION

Commercial laundries handle large volumes of a variety of materials, including table cloths, napkins and other table linens used in restaurants and other food service operations. Uniforms worn by manufacturing and service personnel and others are examples of other types of articles that are typically laundered by commercial laundries. A significant part of the operation of commercial laundries involves sorting the different types of articles while keeping track of where they came from and the number and types of articles that are to be laundered.

Typically, the items are sorted at a sorting table or other sorting station. Like articles are then conveyed pneumatically to another location where they are further handled. Because flexible fabrics tend to ball up when pushed through pneumatic conveyor tubes, they are usually pulled through the tubing system by suction. The type of system that is most prevalent in commercial laundries makes use of vacuum bins that are each provided with a large vacuum motor. The vacuum that is applied to the vacuum bins pulls the laundry items through the conveyor tubes and into the bins.

Although vacuum bins of this type have achieved considerable popularity, they have not been satisfactory in all respects. Their relatively high cost adds appreciably to the capital costs of the laundry equipment. Furthermore, it is necessary for the items in the vacuum bins to be dumped onto a belt conveyor which carries them to the location of receptacles that are typically flexible carts commonly referred to as sling carts. From there, the slings must be weighed for proper wash load weight before being hoisted onto an overhead monorail. The articles must then be manually unloaded from the conveyor and placed in the sling carts. As can easily be appreciated, the need for all of these manual operations adds significantly to the overall labor costs. Finally, the vacuum bins and conveyors that transport articles from the bins to the sling carts occupy considerable space. This is particularly unsatisfactory in the case of commercial laundries because they are usually located in high cost urban areas where they are close to their major customers.

SUMMARY OF THE INVENTION

The present invention is directed to a method and apparatus for conveying flexible fabric articles in an improved way that avoids the shortcomings of vacuum bin systems. In particular, the present invention provides a venturi system that dramatically reduces the equipment costs, labor costs and space requirements compared to vacuum bin systems, belt conveyors and scales.

In accordance with the invention, a uniquely arranged venturi structure is provided for applying a suction force at a selected location along the conveyor tube system rather than at its discharge end as is necessary with a vacuum bin system. Because the venturi is located along the conveyor tubing, the tubing can discharge the fabric items directly into sling carts or other receptacles while also calculating the combined weight of the sling cart contents, thus eliminating the space occupied by the vacuum bins and the intermediate conveying system as well as the labor that is required to manually unload the articles from the vacuum bins and to later load them into the sling carts. This eliminates the need to manually weigh each sling.

The venturi system of the present invention preferably includes an angled pipe which joins the conveyor tubing at an acute angle and is supplied with air by a blower. An inside pipe is located within the tubing at its juncture with the angled venturi pipe in order to provide a restriction that creates a low pressure area in the conveyor tubing. The resulting suction force draws the fabric articles to the area of the venturi and thereafter transports them a relatively short distance to the discharge end of the conveyor tubing by the positive force supplied by the blower. At the discharge end of the tubing, the fabric articles are discharged directly into receptacles such as sling carts.

An important feature of the invention is the provision of a vent in the conveyor tubing at a location downstream from the venturi. The vent is preferably a screened gap in the tubing which allows a portion of the air to escape. The vent significantly enhances the smoothness and reliability of the conveyor system by partially relieving the air pressure and thereby suppressing pressure fluctuations and other unfavorable pressure conditions that can adversely affect operation of the conveyor system. An adjustable sleeve in the preferred embodiment of the invention allows the width of the gap to be adjusted as necessary.

The invention is further characterized by a closed-loop return system that returns air from the vent to the suction side of the blower. The return system provides numerous advantages, including an increase in the blower suction, a decrease in the pressure on the discharge side of the blower to more effectively convey fabrics through the main conduit, and a reduction in noise.

Other and further objects of the invention, together with the features of novelty appurtenant thereto, will appear in the course of the following description.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views:

FIG. 1 is a diagrammatic view of a pneumatic conveyor tubing system that is equipped with a venturi arrangement constructed according to a preferred embodiment of the present invention and used to convey flexible fabrics from a sorting table or other sorting station to receptacles such as sling carts;

FIG. 2 is a fragmentary sectional view on an enlarged scale showing the venturi system and the adjacent portions of the conveyor tubing;

FIG. 3 is a diagrammatic view of a pneumatic conveyor tubing system that is equipped with a venturi arrangement and closed-loop return air system constructed according to an alternative embodiment of the invention; and FIG. 4 is a fragmentary elevational view on an enlarged scale showing the venturi connection and the return loop manifold of the embodiment shown in FIG. 3.

DETAILED DESCRIPTION OF THE INVENTION

The present invention is directed to a method and apparatus for the pneumatic conveying of fabric materials such as table linens (table cloths, napkins and the like), uniforms, and other articles that are typically laundered in commercial laundries, as well as other flexible fabrics that are pneumatically conveyed in other applications. FIG. 1 illustrates diagrammatically a pneumatic conveying system of the type that may be installed in a commercial laundry facility. A sorting table generally identified by numeral 10 or a similar sorting station is used for the sorting of articles and may be equipped with a back panel 12 having an operator interface panel 14. Pneumatic conveyor tubing generally identified by numeral 16 extends from the back of the table and is located for the most part at an overhead location, although other locations are possible.

An opening 18 in the panel 12 may provide an input opening into which articles may be fed into a vertical tube 20 which is part of the conveyor tubing 16. An elbow 22 connects the top end of tube 20 with an elevated horizontal conduit 24 which terminates in a substantially straight end portion 26. The conduit 24 may have virtually any desired configuration and can include bends and other offsets as may be necessary to avoid obstructions or extend the conveyor tubing to the desired location. The conduit 24 may incorporate a number of separate tube sections suitably coupled together.

The end portion 26 of conduit 24 is connected by a coupling 28 with a conduit section 30 which has a substantially straight main body and a branch leg 32. The leg 32 has an axis that is oriented at an acute angle to the longitudinal axis of conduit section 30.

The downstream end of conduit section 30 is connected with another conduit 34. A vent opening between conduits 30 and 34 is provided, preferably by a gap 36 that is covered with a mesh screen 38 (or a perforated pipe). The ends of conduits 30 and 34 are spaced apart so that the gap 36 extends circumferentially around the conveyor tubing. The screen 38 covers the entirety of the gap 36 to prevent articles that are being conveyed from passing out of the conveyor tubing 16 through the gap. A solid sleeve 39 is fitted closely around the downstream end of conduit section 30 and is adjustable in a manner to wholly or partially cover the screen 38 or to not cover the screen at all. The sleeve 39 slides back and forth in order to vary the size of the gap 36 and thus vary its exposure.

The downstream end of conduit 34 is provided with a plurality of serially arranged fittings 40, 42 and 44. Each fitting 40, 42 and 44 has a discharge opening 46 which is controlled by a flapper valve 48 or other device. The openings 46 may be located and oriented as desired. The valves 48 are controlled by a suitable control system (not shown) which is not a part of the present invention. Immediately underlying the discharge openings 46 are respective receptacles 50 which may take the form of sling carts or other types of receptacles or other devices such as belt conveyors that receive the fabric articles that discharge through the openings 36 of the fittings 40, 42 and 44.

The branch leg 32 forms part of a venturi arrangement constructed according to a preferred embodiment of the present invention. A blower 52 which may be mounted on the floor or elsewhere is powered by a motor 54. The blower 52 has an intake or suction side 52a and a discharge side 52b. The blower 52 operates to force air from the discharge side 52b of the blower through piping that includes an inclined or angled pipe 56 leading to connection with the branch leg 32.

With reference to FIG. 2 in particular, an inside pipe 58 is suitably supported concentrically inside of the conduit section 30 and is positioned to overlie the inlet opening 60 formed at the intersection of the branch leg 32 with the main body of conduit 30. The inside pipe 58 is smaller in diameter than the main body of conduit 30 to provide a restriction 62 adjacent to the downstream end 64 of the inside pipe 58. The restriction 62 is annular and creates a reduced volume region adjacent to the end 64 in order to provide a low pressure in the conduit section 30 at the area of the downstream end 64 of the inside pipe 58. The end 64 is spaced downstream from the opening 60 by a distance identified by numeral 66 in FIG. 2. By way of example, the conduit end portion 26 may be a six inch diameter pipe, with the main body of conduit section 30 being an eight inch diameter pipe. The inside pipe 58 preferably has approximately the same diameter as the end portion 26, or six inches in the case where the conduit end portion 26 is a six inch pipe. With these dimensions, the distance 66 is preferably about three inches, although the distance can vary considerably.

The inside pipe 58 has an upstream end 68 which is spaced downstream from the conduit end portion 26 by a distance identified by numeral 70 in FIG. 2. With the pipe sizes given previously by way of example, the distance 70 may be approximately six to seven inches, although this dimension can also vary considerably without adversely affecting the operation of the system. Both ends of the inside pipe 58 are open so that the fabric articles that are being conveyed through the tubing 16 can pass through pipe section 58. With the pipe sizes given, the length of the inside pipe 58 may be about 24 inches, although variations are possible.

The screen 38 is preferably cylindrical and is fitted over the downstream end of conduit section 30 and secured thereon by a band type pipe strap 72 or other suitable means. The screen 38 is fitted around the upstream end of conduit 34 and secured by a band type strap 74 or another suitable means. Connecting screen 38 in this fashion connects conduits 30 and 34 to one another. The distance between the downstream end 64 of the inside pipe 58 and the gap 36 is preferably no less than 10 inches and can be considerably greater. The length of the gap 36 between the ends of the conduits 30 and 34 may be approximately six inches, although the length of the gap can vary considerably depending upon a number of factors, including the sizes of the pipes and blower and the location of the gap relative to the venturi. The width of the gap 36 can also be adjusted by sliding the sleeve 39 to control its exposure.

In operation, the blower 52 operates to force air through the inclined pipe 58 and the branch leg 32 into conduit 30 at the restriction 62. The abrupt change in volume provided by the restriction 62 creates a low pressure area adjacent to the downstream end 64 of the inside pipe 58. Fabric articles that are loaded into the conveyor tubing 16 are drawn through the conduits 20 and 24 and into the conduit section 30 by the suction resulting from the low pressure area, and the articles are drawn through the inside pipe 58. Downstream from the venturi, the articles are conveyed to the discharge fittings 40, 42 and 44 by the positive force of the air supplied by the blower 52.

The flapper valves 48 are suitably controlled to open a selected one of the valves 48, such as the valve of fitting 42 as shown in FIG. 1. The articles are then deflected by the flapper valve 48 through the discharge opening 46 and into the underlying receptacle 50 identified as receptacle #2 in FIG. 1. Different articles are similarly deposited into the other receptacles 50 by opening the flapper valve 48 associated with the corresponding fitting 40 or 44. It should be understood that virtually any desired number of discharge fittings can be provided and that other types of discharge systems can be used in connection with the pneumatic conveying system.

The vent effect provided by the gap 36 is an important feature of the invention because it allows a portion of the air supplied by the blower 52 to escape from the conveyor tubing 16. The escape of some of the air avoids significant pressure fluctuations and other unfavorable pressure conditions in the tubing 16, thereby enhancing the reliability of the conveying system and assuring that it operates smoothly.

The suction effect created by the venturi of the present invention is applied at a selected location along the conveyor tubing 16 rather than at the discharge end of the tubing as is necessary with a vacuum bin system. Consequently, the fabric articles that are being conveyed can be deposited directly into the receptacles 50, rather than having to be removed from a vacuum bin and separately conveyed to the location of the receptacles 50 where an additional manual operation of depositing the articles in the receptacles 50 is required. Thus, the venturi system of the present invention is a substantial improvement over a vacuum bin system in a number of respects, namely, the elimination of the high cost of the vacuum bins and the quantity of vacuum motors required, a reduction in the labor that is required, and a reduction in the amount of space occupied by the equipment.

FIGS. 3 and 4 depict an alternative embodiment of the invention which is similar in nearly all respects to the embodiment shown in FIGS. 1 and 2. The same reference numerals used in FIGS. 1 and 2 are used in FIGS. 3 and 4 to identify components that are substantially the same in the two embodiments.

The principal difference in the embodiment of FIGS. 3 and 4 is that a closed loop air return system is provided to return air that is discharged through the vent provided by the gap 36 to the suction side 52a of blower 52. The return air system provides a closed loop extending from the vent to the suction side of the blower.

The closed loop return air system includes a manifold box 80 which extends around the screen 38 and the gap 36 on the piping system. The manifold box 80 provides an enclosure which receives all of the air that discharges through the gap 36. The manifold box 80 is provided with a fitting 82 that connects by means of another fitting 84 with a return air conduit 86. As shown in FIG. 3, the conduit 86 connects through an elbow 88 with a horizontal pipe 90 that leads to connection with the suction side 52a of blower 52.

The system of FIGS. 3 and 4 operates in substantially the same manner as the system of FIGS. 1 and 2, except that the air that is vented through the gap 36 is collected in the manifold box 80 and returned to the suction side 52a of blower 52 through the conduit 86, elbow 88 and pipe 90. The closed loop return air system is advantageous in that it increases the suction on the suction side of blower 52 and decreases the pressure on the discharge side 52b of the blower, thus making the conveying system effective and efficient in conveying fabric items through the conveyor system. In addition, the air that is vented through the gap 36 is wholly contained within the manifold box 80 and the return piping system rather than being discharged into the room as is the case with the embodiment shown in FIGS. 1 and 2. A significant noise reduction is achieved by containing the air within the components of the return air system rather than discharging it directly into the room, and this noise reduction provides another significant benefit.

From the foregoing, it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having briefly described an embodiment of the present invention, an exemplary operating environment for the present invention is described below.

What is claimed is:

1. A system for conveying flexible fabric items comprising:
   a main conduit having an input end for receiving said items and a discharge end for discharging said items, said main conduit providing a substantially enclosed path for conveying said items from the input end to the discharge end;
   a selected portion of said main conduit having a substantially straight conduit section presenting a longitudinal axis;
   an angled pipe connecting with said conduit section and having an axis arranged at an acute angle to said longitudinal axis;
   a blower having a suction side and a discharge side for forcing air from said discharge side through said angled pipe and into said conduit section;
   a restriction in said selected portion of said main conduit in proximity to the connection of said angle pipe with said conduit section to effect a low pressure area adjacent said restriction when air is forced through said angled pipe into said conduit section, thereby drawing air through said main conduit to convey said items from said input end to said discharge end;
   a vent in said main conduit at a location downstream from said restriction and upstream from said discharge end of the main conduit for allowing escape of air from the main conduit between said restriction and said discharge end; and a return conduit extending from said vent to said suction side of the blower.

2. A system as set forth in claim 1, wherein said vent comprises a gap in said conduit extending substantially continuously around the conduit.

3. A system as set forth in claim 1, including a sleeve on said conduit slidable thereon to control the exposure of said gap.

4. A system as set forth in claim 2, including a mesh applied to said conduit at said gap.

5. A system as set forth in claim 1, wherein the size of said vent is adjustable.

6. A system as set forth in claim 1, wherein said vent is located no closer than approximately 10" away from said restriction.

7. A system as set forth in claim 1, including an inside pipe in said selected portion of the conduit spaced inwardly from said selected portion to provide said restriction between said inside pipe and said selected portion of the conduit.

8. A system as set forth in claim 7, wherein:
said selected portion of the conduit is substantially cylindrical; and
said inside pipe is substantially cylindrical and is generally concentric with said selected portion.

9. A system as set forth in claim 8, wherein:
said inside conduit has open upstream and downstream ends and forms part of said path.

10. A system as set forth in claim 9, wherein said downstream end of the inside conduit is spaced downstream end of the inside conduit is spaced downstream from the connection between said angled pipe and said conduit section.

11. A system as set forth in claim 9, wherein:
said conduit includes a substantially cylindrical pipe adjacent to said conduit section and providing an inlet thereto;
said substantially cylindrical pipe has a diameter substantially equal to the diameter of said inside conduit; and
said substantially cylindrical pipe has an end spaced upstream from the upstream end of said inside conduit.

12. A system as set forth in claim 1, including a manifold substantially surrounding said vent for receiving air passing through the vent, said return conduit having one end connected with said manifold and another end connected with said suction side of the blower.

13. A system as set forth in claim 1, wherein the flexible fabric items are linens.

* * * * *